INVENTOR:
SABBAS N. XENAKIS,
BY Francis H. Boos, Jr.
HIS ATTORNEY.

March 17, 1970 S. N. XENAKIS 3,501,672

DRIVE FOR TELEVISION RECEIVER HORIZONTAL SWEEP CIRCUIT OUTPUT TRANSISTOR

Filed Oct. 25, 1968 2 Sheets-Sheet 2

INVENTOR:
SABBAS N. XENAKIS,

BY Francis H. Boos, Jr.

HIS ATTORNEY.

United States Patent Office 3,501,672

Patented Mar. 17, 1970

3,501,672

DRIVE FOR TELEVISION RECEIVER HORIZONTAL SWEEP CIRCUIT OUTPUT TRANSISTOR

Sabbas N. Xenakis, Portsmouth, Va., assignor to General Electric Company, a corporation of New York Filed Oct. 25, 1968, Ser. No. 770,620

Int. Cl. H01j *29/70*

U.S. Cl. 315—27 8 Claims

ABSTRACT OF THE DISCLOSURE

A television receiver horizontal sweep circuit is provided which has the horizontal deflection coils of a cathode ray picture tube coupled to and supplied from a high voltage transformer winding. The high voltage transformer winding is excited from a relatively low voltage battery through a horizontal output amplifier whose output is coupled through at least part of the high voltage transformer winding to the low voltage battery. A horizontal transistor buffer amplifier has its output coupled to and driving the horizontal output transistor amplifier and has a source of horizontal sweep frequency signals coupled to its base. An intermediate voltage rectifying and smoothing circuit is coupled across at least a portion of the high voltage transformer winding for deriving an intermediate value operating voltage, and means are provided for supplying the intermediate value operating voltage back to the horizontal buffer amplifier as an energizing potential to thereby provide an improved drive for the horizontal output amplifier.

BACKGROUND OF INVENTION

Field of invention

This invention relates to a new and improved television receiver horizontal sweep circuit.

More particularly, the invention relates to a horizontal sweep circuit for low voltage, battery powered portable television receiver sets which provides improved output power drive for the horizontal output amplifier that supplies deflection current to the horizontal deflection coils of the television receiver cathode ray picture tube.

Description of the prior art problem

Battery powered, portable television receiving sets have been available commercially for a number of years. One of the most difficult design considerations in producing such battery powered, portable television receivers is the obtainment of adequate operating power for the several stages of the receiver from the relatively low voltage batteries used to power such sets. For the most part, twelve (12) volt batteries are employed as the primary power source in many portable television receivers, while a number of the stages and components of the receiver are designed for operation at much higher voltages. Accordingly, considerable design effort has been expended in the past in developing suitable circuit arrangements and components for use in portable television receivers, and which are capable of operating satisfactorily from batteries.

One of the problems encountered in the design of battery-operated, portable television receivers is the provision of a suitable horizontal sweep circuit for supplying adequate driving current to the horizontal deflection coils of the television receiver cathode ray picture tube. For this purpose, it has been the practice to employ a high voltage transformer winding that is periodically energized at the horizontal sweep frequency from the low voltage battery source by means of a horizontal output amplifier. The high voltage transformer winding is designed in such a manner that it transforms the current to a value required to drive the horizontal deflection coils of the picture tube.

In the process, the voltage built up across the winding places rigorous demands on the horizontal output amplifier. The demands are such that many of the horizontal output amplifiers heretofore used in portable television receiver sets have failed in service. To overcome this problem, the present invention was devised.

SUMMARY OF INVENTION

It is therefore a primary object of the invention to provide a new and improved television receiver horizontal sweep circuit for low voltage, battery powered portable television receiver sets which provides improved output power drive for the horizontal output amplifier that supplies deflection current to the horizontal deflection coils of the television receiver cathode ray picture tube.

In practicing the invention, a television receiver horizontal sweep circuit is provided which has horizontal deflection coils coupled to and supplied from a high voltage transformer winding. A relatively low voltage source of energizing potential comprised by a battery is provided and a horizontal output transistor amplifier is employed to excite at least part of the high voltage transformer winding from the low voltage battery source of energizing potential. A horizontal transistor buffer amplifier is provided and has its output coupled to and driving the horizontal output transistor amplifier with a source of horizontal sweep frequency signals being coupled to the input of the buffer amplifier. An intermediate voltage rectifying and smoothing circuit is coupled across at least a part of the high voltage transformer winding and serves to derive an intermediate value operating voltage, and a connection is provided for supplying the intermediate value operating voltage thus derived back to the horizontal buffer transistor amplifier as an energizing potential to thereby provide improved drive for the horizontal output transistor amplifier.

The output of the horizontal buffer transistor amplifier is transformer coupled to the input of the horizontal output transistor amplifier by a coupling transformer having primary and secondary windings. The secondary winding of the coupling transformer is connected across the emitter-base of the horizontal output transistor amplifier and the primary winding is connected in the emitter-collector circuit of the horizontal buffer transistor amplifier. Preferably, current limiting and sweep frequency bypass circuit means are connected in series circuit relationship with the primary winding of the coupling transformer for limiting the average current flowing in the emitter-collector circuit of the horizontal buffer transistor amplifier to a safe value while bypassing signals at the horizontal sweep frequency around the current limiting component to thereby allow the required sweep frequency current pulses to be produced undiminished in the secondary winding of the coupling transformer.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

Figure 1:
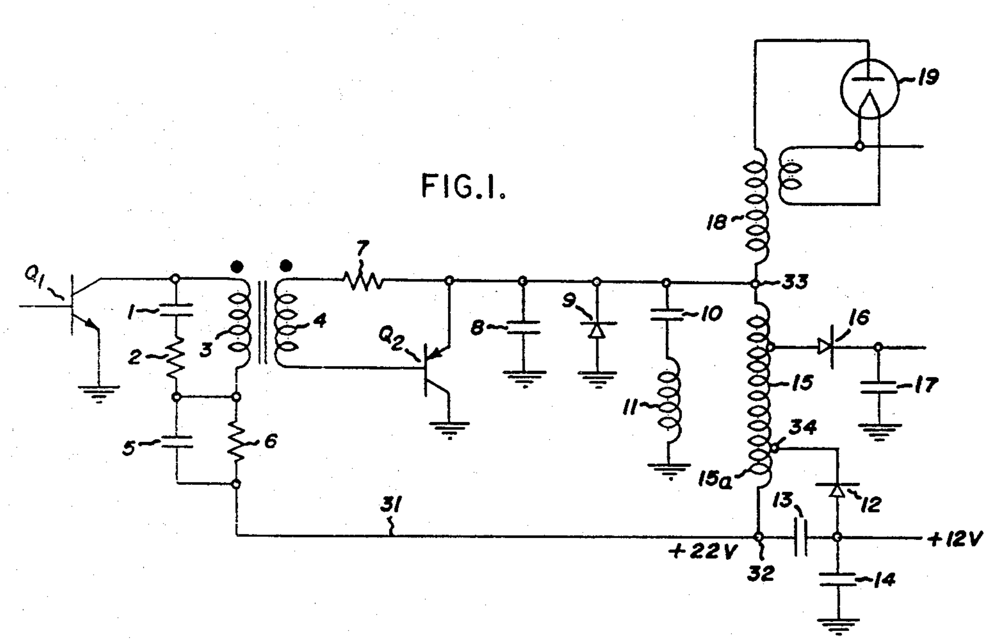
FIGURE 1 is a schematic circuit diagram of a new and improved television receiver horizontal sweep circuit constructed in accordance with the invention.

FIGURE 1 is a schematic circuit diagram of a preferred form of constructing a new and improved television receiver horizontal sweep circuit in accordance with the invention. For convenience, only the sweep circuit itself, or for that matter the portions of the sweep circuit which are involved with the invention are shown in FIGURE 1. For simplicity, it is assumed that a horizontal synchronizing sweep signal has been derived in prior stages of a portable television receiver by conventional circuitry, and is supplied to the base of the horizontal buffer transistor amplifier comprised by a NPN transistor $Q_1$ shown in FIGURE 1. Transistor $Q_1$ has its emitter connected directly to ground, and its collector connected to one end of the primary winding 3 of a coupling transformer having a secondary winding 4 inductively coupled to the primary winding 3. The remaining end of primary winding 3 is connected through a current limiting resistor 6 over a conductor 31 to a juncture 32 of a winding portion **15*a* with a filter capacitor 13. In addition, a capacitor 5 is connected in parallel circuit relaitonship with the current limiting resistor 6 and serves to bypass current components at the horizontal sweep frequency around the resistor 6 in order not to diminish the current pulse produced in the coupling transformer 3, 4. To prevent undesired ringing oscillation in the primary winding 3, a damping circuit comprised by a capacitor 1 and a series connected resistor 2 is connected in parallel circuit relationship across the primary winding 3**.

The secondary winding 4 of the coupling transformer has one of its ends connected directly to the base of a horizontal output PNP transistor $Q_2$ and the remaining end connected through a limiting resistor 7 to the emitter of transistor $Q_2$. The collector of transistor $Q_2$ is connected directly to ground. The emitter of transistor $Q_2$ is also connected to one terminal of a ringing capacitor 8 whose remaining terminal is grounded, to the cathode of a damping diode 9 whose anode is grounded, to one terminal of a tuning capacitor 10 connected in series circuit relationship with the horizontal deflection coil 11 of a cathode ray picture tube (not shown), and to the high voltage terminal 33 of a high voltage transformer primary winding 15. An intermediate tap point 34 on the high voltage transformer primary winding 15 is connected through a rectifying diode 12 to the positive terminal of a 12-volt battery (not shown). The positive terminal of the 12-volt battery is also connected to a filter capacitor 14 and to one terminal of a smoothing capacitor 13 whose remaining terminal is connected to the low-voltage juncture point 32 of the high voltage transformer primary winding 15. The arrangement is such that the diode rectifier 12 operates to rectify the voltage appearing across the portion of the winding **15*a* of high voltage transformer winding 15, and to build up a direct current voltage across the smoothing capacitor 13 which raises the potential of juncture point 32 to a value which is intermediate the low 12-volt value of the battery supply and the high voltage developed across the primary winding 15. Thus it will be appreciated that diode rectifier 12 in conjunction with smoothing capacitor 13 comprises a rectifying and smoothing circuit for developing an intermediate value voltage of about 22 volts at the juncture point 32** to which the collector of horizontal buffer transistor $Q_1$ is connected.

To complete the circuit shown in FIGURE 1, additional rectified direct current voltage for use at other stages of the television receiver may be derived by an additional rectifying and smoothing network comprised by a diode 16 and filter capacitor 17 connected to a tap point intermediate the juncture point 34 and the high voltage end of primary winding 15. The high voltage end 33 of winding 15 is connected to the low voltage end of a tertiary winding 18 that is inductively coupled to the high voltage primary winding 15 and serves to develop an extremely high voltage (approximately 10 to 12 kilovolts) that is rectified by a high voltage rectifier 19 and applied to the second anode of the television cathode ray picture tube (not shown).

In operation, the circuit of FIGURE 1 functions in the following manner: The horizontal sweep frequency synchronizing pulses developed in the prior stages of the portable television receiver are supplied to the base of the horizontal buffer transistor $Q_1$, and are in the form of a series of positive going voltage pulses of short microsecond duration occurring at the horizontal sweep frequency. The horizontal sweep frequency, positive going voltage pulses cause buffer amplifier $Q_1$ to be turned on for about 15 microseconds, and results in the production of a sharp positive current pulse in the secondary winding 4 which is positive at the no-dot end of winding 4 and results in turning the horizontal output transistor $Q_2$ off. While horizontal output transistor $Q_2$ is turned off, the charging capacitor 10 will be charged to some predetermined value by current supplied from the 12-volt battery source through diode rectifier 12, the upper portion of high voltage transformer primary winding 15, and by ringing oscillations from the ringing capacitor 8. Thereafter, upon the termination of the horizontal sweep frequency synchronizing pulse applied to the base of buffer transistor $Q_1$, $Q_1$ will turn off, and a current will be induced in the secondary winding 4 which now becomes negative at the no-dot end of winding 4 and causes transistor $Q_2$ to turn on. When transistor $Q_2$ turns on, current will flow out of the charging capacitor 10 through $Q_2$ and through the deflection coil 11 in a well known manner. Current flow through the deflection coil 11 will be in accordance with the R-L time constant of the circuit and produces the desired linear, horizontal sweep of the cathode ray picture tube beam across the face of the picture tube. At the end of the sweep during the retrace portion, the next successive horizontal sweep frequency synchronizing pulse will be applied to the base of buffer transistor $Q_1$, causing this transistor to again turn on and initiate a new sweep cycle.

Upon turn-on of transistor $Q_1$, the cycle will again be repeated as described above; however, due to the magnetic field built up in deflection coil 11 prior to the time of turn-off of output transistor $Q_2$, a current will be induced in deflection coil 11 in accordance with Lenz law which is supplied to the ringing capacitor 8 in a well known ringing oscillatory manner. Damping diode 9 then conducts to damp out part of the ringing oscillation and the circuit is conditioned for a new cycle of operation by a portion of the charge in the ringing capacitor 8 being returned to recharge charging capacitor 10 to a desired potential value and polarity with any deficiency in the value of the charge on capacitor 10 being supplied from the 12-volt battery source in the previously described manner. This operation is then repeated periodically at the horizontal sweep frequency rate.

Figure 2:
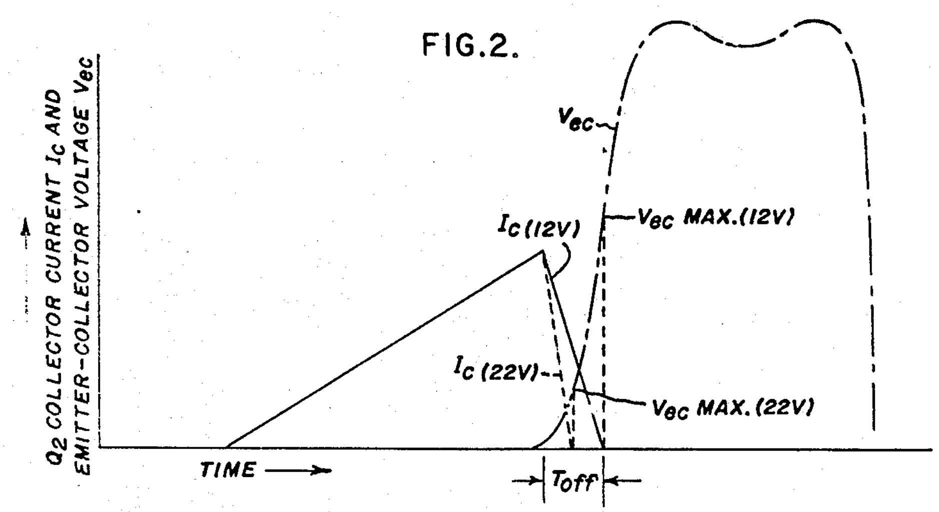
FIGURE 2 is a schematic diagram illustrating the voltage and current versus time characteristics of a typical horizontal output transistor amplifier, and depicts the condition under which failure of the amplifier can occur.

In the past, difficulty has been encountered in the operation of the horizontal sweep circuit as described above due to the fact that insufficient drive was available to cause the transistor $Q_2$ to turn off in a sufficiently short period of time to prevent damage. Prior art circuits of this nature would be exemplified by an arrangement where the no-dot end of primary winding 3 of the coupling transformer (represented by the juncture of the winding 3 with the current limiting resistor 6), would be connected directly to the 12-volt battery supply instead of the arrangement as shown in FIGURE 1. With such a prior art circuit connection, operation of the circuit would be as is depicted by solid lines in FIGURE 2 of the drawings. In FIGURE 2, the solid line curve represents the substantially saw-tooth wave-shape current flowing in the collector of transistor $Q_2$ during the trace and re-trace portion of each horizontal sweep cycle where time is plotted as the abscissa and the magnitude of the collector current flowing in horizontal output transistor $Q_2$ is plotted as the ordinate.

As is best shown in FIGURE 2, the portion of the abscissa marked $T_{off}$ represents a portion of the retrace portion of a horizontal sweep cycle, and is determined by the time required to turn off the horizontal output transistor $Q_2$. As the horizontal output transistor $Q_2$ turns off, the voltage reapplied across its emitter-collector ($V_{ec}$) by high voltage transformer winding 15*a* builds up in the manner shown by the dash-dot curve and commences at the time of the turn-off. The interval during which this dash-dot $V_{ec}$ curve overlaps the solid collector current curve depicts the power being consumed in the horizontal output transistor $Q_2$ during the turn-off or retrace interval. If this power becomes excessive due to a slow fall time for collector current $i_c$ with increasing $V_{ec}$ second breakdown and/or thermal runaway can occur in the horizontal output transistor $Q_2$. The result, ultimately, is at worst destruction of transistor $Q_2$ or at best severe alteration of its characteristics. In order to correct this condition, it is necessary that the current flowing in the collector of horizontal output transistor $Q_2$ be reduced at a much faster rate so that it follows along a line such as that shown in dotted lines in FIGURE 2. From an examination of FIGURE 2, it will be seen that the dotted line collector current curve ceases when the dash-dot $V_{ec}$ curve is at a much lower point, and hence results in considerably lower power consumption than in the previously described condition. The present invention makes it possible to cause the turn-off current flowing in the collector of transistor $Q_2$ to follow along a curve such as that depicted in the dotted line curve of FIGURE 2.

Figure 3:
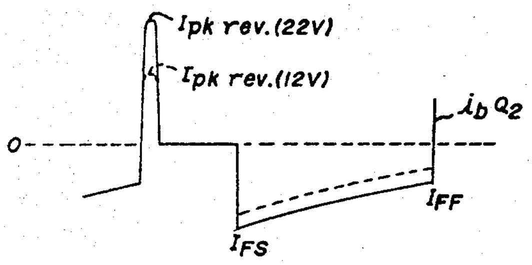
FIGURE 3 is a schematic diagram illustrating the current versus time characteristics of the base current being supplied to a horizontal output transistor used in the circuit of FIGURE 2, and depicts the value of the drive current for the horizontal output transistor obtained by reason of the invention, and compares this value to the value of drive current obtained with prior art arrangements.

FIGURE 3 of the drawings is a plot of the base current flowing in the base of the horizontal output transistor $Q_2$ for one horizontal sweep frequency cycle, and illustrates the polarity and magnitude of this base current. In FIGURE 3, the dotted line depicts the value of the base current of output transistor $Q_2$ for a 12-volt power connection to the buffer amplifier $Q_1$ in the conventional manner as described briefly above. From a comparison of this dotted curve to the solid line curve which depicts the value of the base current for the higher value intermediate voltage (22 volts) connection as shown in FIGURE 1, it will be appreciated that a much larger value reverse peak current $I_{pk.rev.}$ is obtained with the circuit arrangement made available by the invention. Thus, it will be seen that with the conventional known 12-volt connection, the maximum $I_{pkr}$ is limited in a manner such that some horizontal output transistors (those with a high forward current gain ($h_{FE}$) or slow pulse fall time ($t_f$)) do not stop drawing collector current fast enough relative to the buildup in reapplied voltage across the emitter-collector ($V_{ec}$) as depicted in FIGURE 2, to prevent damage. By returning the collector of the buffer transistor amplifier $Q_1$ to the plus 22 volt intermediate voltage that exists at junction 32 due to the intermediate voltage rectifying and smoothing circuit comprised by diode 22, capacitor 13, and winding portion 15*a*, sufficient voltage is made available across the base-emitter junction of horizontal output transistor $Q_2$. This results in producing adequate base peak reverse current $I_{pk.rev.}$ at the beginning of turn-off of transistor $Q_2$ to reduce the collector current $i_c$ of $Q_2$ rapidly enough to prevent coincident existence of high collector current and high emitter to collector voltage, and to cause a plot of $i_c$ to follow along a path such as that shown in dotted lines in FIGURE 2.

The resistor 6 connected in the collector circuit of buffer transistor amplifier $Q_1$ limits the average current flowing in the collector to a safe value while the bypass capacitor 5 acts to allow the required horizontal sweep frequency current pulse to be produced in the coupling transformer undiminished.

It should be noted, that although, during the first few cycles of operation of the horizontal sweep circuit arrangement shown in FIGURE 1 following receiver turn-on, the collector of buffer transistor amplifier $Q_1$ is not supplied with the full 22-volts due to the fact that the rectifier and smoothing circuit 12, 13 and 15*a* has not yet had an opportunity to build up the charge on smoothing capacitor 13 to an adequate value, the same limitation applies to the build up in voltage across high voltage transformer primary winding 15. Therefore, the peak amplitude of the reapplied voltage across the emitter-collector of output transistor $Q_2$ ($V_{ec}$) is not so high as is encountered after a few cycles of operation, so that the drive requirements for output transistor $Q_2$ are not as severe. Since all three of these conditions increase together, they are in a sense self-compensating and no damaging effects occur during the short transient period following turn-on of the receiver.

Figure 4:
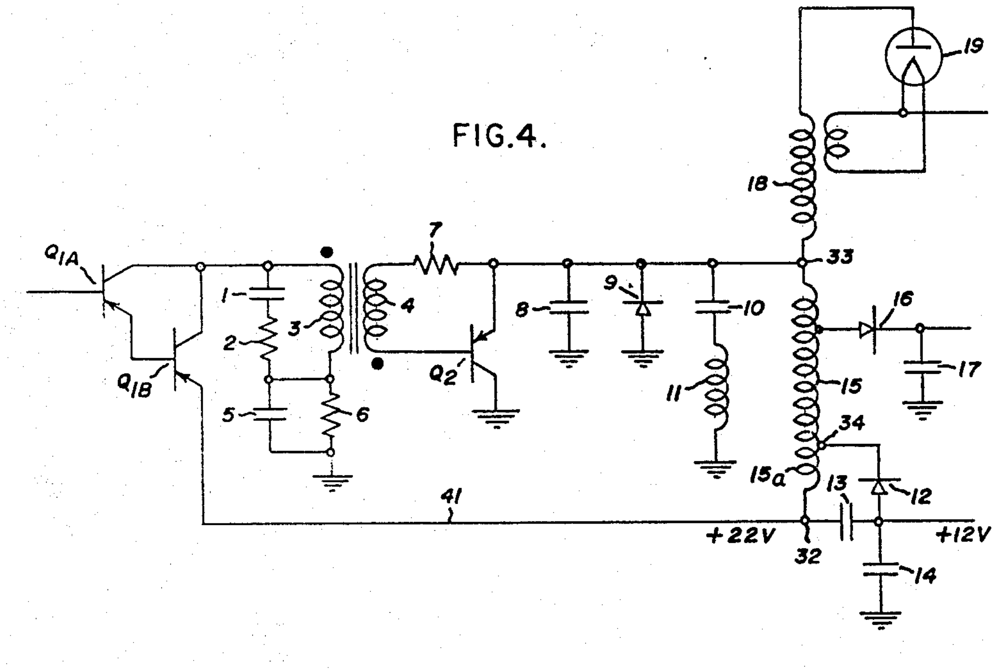
FIGURE 4 is a schematic circuit diagram of a modified form of the new and improved television receiver horizontal sweep circuit constructed in accordance with the invention.

FIGURE 4 is a modified form of the new and improved horizontal sweep circuit wherein PNP junction transistors are employed in constructing the horizontal buffer amplifier. In the circuit arrangement shown in FIGURE 4, all of the components of the circuit are the same as the correspondingly numbered components in the FIGURE 1 arrangement. It should be noted, however, that in the FIGURE 4 circuit, the no-dot end of the primary winding 3 of the coupling transformer is connected through the current limiting resistor 6 directly to ground and the dot end of winding 3 is directly connected to the collector electrode of a pair of PNP transistors $Q_{1A}$ and $Q_{1B}$ which are interconnected in a well known Darlington regenerative feedback manner. For this purpose, both collectors of $Q_{1A}$ and $Q_{1B}$ are connected together and the emitter of $Q_{1A}$ is connected to the base of transistor $Q_{1B}$. The emitter of transistor $Q_{1B}$ is connected through a conductor 41 back to the intermediate voltage juncture 32 of the intermediate voltage rectifying and smoothing circuit comprised by diode rectifier 12, smoothing capacitor 13, and winding portion 15*a*.

In operation, the circuit of FIGURE 4 functions in substantially the same manner as the circuit arrangement of FIGURE 1 with the exception of the difference in relative conducting intervals of $Q_{1A}$ and $Q_{1B}$ with respect to horizontal output transistor $Q_2$. The provisions of the two transistor Darlington configurations $Q_{1A}$ and $Q_{1B}$ insures that the horizontal buffer amplifier stage will remain in saturation throughout a substantial part of its conducting interval, and also reduces the loading during high current peaks on the horizontal sweep oscillator of the receiver. If desired, a single PNP junction transistor of adequate power rating can be substituted for the Darlington configuration shown in FIGURE 4.

From the foregoing description, it will be appreciated that the invention provides a new and improved television receiver horizontal sweep circuit for low voltage, battery powered portable television receivers which provides improved output power drive for the horizontal output amplifier that supplies deflection current to the horizontal deflection coils of the television receiver cathode ray picture tube and hence assures against premature failure of the horizontal output transistors during service.

Having described two embodiments of a new and improved television receiver horizontal sweep circuit constructed in accordance with the invention, it is believed obvious that other modifications and variations of the invention are possible in the light of the above teachings. It is therefore to be understood that changes may be made in the particular embodiments of the invention described whether within the full intended scope of the invention as defined by the appended claims.

What is claimed is:

1. In a television receiver horizontal sweep circuit having horizontal deflection coils coupled to and supplied from a high voltage transformer winding the improvement comprising a relatively low voltage source of energizing potential, horizontal output amplifier means having its output coupled to the low voltage source of energizing potential through at least a part of the high voltage transformer winding, horizontal buffer amplifier means having the output thereof coupled to and driving the horizontal output amplifier means and having the input thereof supplied from a source of horizontal sweep frequency signals, intermediate voltage rectifying and smoothing circuit means coupled across at least a portion of said high voltage transformer winding for deriving an intermediate value operating voltage therefrom, and means for supplying the intermediate value operating voltage thus derived back to said horizontal buffer amplifier means as an energizing potential to thereby provide improved drive for the horizontal output amplifier means, both the horizontal output amplifier means and the horizontal buffer amplifier means comprising transistor amplifiers, the output of the horizontal buffer transistor amplifier being transformer coupled to the input of the horizontal output transistor amplifier by a coupling transformer having a primary winding and a secondary winding, the secondary winding being connected across the emitter-base of the horizontal output transistor amplifier and the primary winding being connected in the emitter-collector circuit of the horizontal buffer transistor amplifier, and current limiting circuit means being connected in series circuit relationship with the primary winding of said coupling transformer and the intermediate voltage rectifying and smoothing circuit means for limiting the average current flowing in the emitter-collector circuit of said horizontal buffer transistor amplifier to a safe value.

2. A television receiver horizontal sweep circuit according to claim 1 further including horizontal sweep frequency bypass circuit means connected in parallel circuit relationship with said current limiting circuit means for bypassing signals at the horizontal sweep frequency around the current limiting circuit means thereby allowing the required sweep frequency current pulses to be produced undiminished.

3. A television receiver horizontal sweep circuit according to claim 2 wherein the horizontal output transistor amplifier comprises a PNP junction transistor having its base-emitter connected across the secondary winding of said coupling transformer, its emitter connected through at least part of the high voltage transformer winding to the low voltage source of energizing potential, and its collector grounded.

4. A television receiver horizontal sweep circuit according to claim 3 wherein the horizontal buffer transistor amplifier comprises an NPN junction transistor having its base connected to a source of horizontal sweep frequency signals, and its collector connected in series circuit relationship through the primary winding of the coupling transformer and a parallel connected resistor-capacitor network that comprises the current limiting and horizontal sweep frequency by-pass circuit means to the intermediate voltage rectifying and smoothing circuit means, the emitter of said buffer NPN junction transistor being grounded.

5. A television receiver horizontal sweep circuit according to claim 4 including damping circuit means comprised by a series connected resistor and capacitor connected in parallel circuit relationship with the primary winding of said coupling transformer for damping out undesired ringing oscillations that otherwise might be produced in the primary winding circuit.

6. A television receiver horizontal sweep circuit according to claim 3 wherein the horizontal buffer transistor amplifier comprises at least one PNP junction transistor having its base connected to a source of horizontal sweep frequency signals, its collector in series circuit relationship through the primary winding of the coupling transformer and a parallel connected resistor-capacitor network that comprises the current limiting and horizontal sweep frequency by-pass circuit means to ground, and said at least one PNP junction transistor having its emitter connected to the intermediate voltage rectifying and smoothing circuit means.

7. A television receiver horizontal sweep circuit according to claim 6 further including damping circuit means comprised by a series connected resistor and capacitor connected in parallel circuit relationship with the primary winding of said coupling transformer for damping out undesired ringing oscillations that otherwise might be produced in the primary winding circuit.

8. A television receiver horizontal sweep circuit according to claim 7 wherein the horizontal buffer transistor amplifier comprises a pair of PNP junction transistors interconnected in a Darlington regenerative feedback configuration for increased power handling capability.

References Cited

UNITED STATES PATENTS 3,174,074 3/1965 Massman ---------- 315—27

RODNEY D. BENNETT, Jr., Primary Examiner

JOSEPH G. BAXTER, Assistant Examiner